(12) United States Patent
Brownlee et al.

(10) Patent No.: US 6,644,690 B2
(45) Date of Patent: Nov. 11, 2003

(54) MOTOR VEHICLE STEERING COLUMN SUPPORT ASSEMBLY

(75) Inventors: Adrian Thomas Brownlee, Billerray (GB); Robert Leslie Easter, Hadleigh (GB); Sheldon Tamsett, Billerray (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 93 days.

(21) Appl. No.: 10/045,713

(22) Filed: Oct. 29, 2001

(65) Prior Publication Data

US 2002/0056982 A1 May 16, 2002

(30) Foreign Application Priority Data

Nov. 1, 2000 (GB) ............................................. 0026643

(51) Int. Cl.⁷ .................................................. B62P 1/16
(52) U.S. Cl. ........................ 280/779; 280/777; 180/90; 296/72; 74/492
(58) Field of Search ................................ 280/779, 777; 180/90; 296/70, 72, 203.02; 74/492

(56) References Cited

U.S. PATENT DOCUMENTS

| | | | | |
|---|---|---|---|---|
| 4,355,820 A | * | 10/1982 | Kitagawa et al. | 280/779 |
| 4,362,319 A | * | 12/1982 | Masaki et al. | 280/779 |
| 4,671,536 A | * | 6/1987 | Yoshimura | 280/779 |
| 4,682,788 A | * | 7/1987 | Yoshimura | 280/779 |
| 4,690,432 A | * | 9/1987 | Sakamoto et al. | 280/775 |
| 5,238,286 A | * | 8/1993 | Tanaka et al. | 296/70 |
| 5,341,895 A | * | 8/1994 | Grinberg et al. | 180/326 |
| 5,387,023 A | * | 2/1995 | Deneau | 296/72 |
| 5,564,769 A | * | 10/1996 | Deneau et al. | 296/72 |
| 5,782,136 A | * | 7/1998 | Witkovsky et al. | 74/492 |
| 5,810,393 A | | 9/1998 | Joest et al. | |
| 5,868,426 A | * | 2/1999 | Edwards et al. | 280/779 |
| 6,092,840 A | * | 7/2000 | Sugawara | 280/779 |
| 6,220,630 B1 | * | 4/2001 | Sundholm et al. | 280/777 |
| 6,250,678 B1 | * | 6/2001 | Yoshinaka et al. | 280/752 |
| 6,276,740 B1 | * | 8/2001 | Mellor et al. | 296/72 |
| 6,450,533 B1 | * | 9/2002 | Kimura et al. | 280/779 |
| 6,517,114 B1 | * | 2/2003 | Scheib et al. | 280/779 |
| 6,523,878 B2 | * | 2/2003 | Scheidel | 296/70 |

FOREIGN PATENT DOCUMENTS

DE 195 47 858 C1 7/1997

* cited by examiner

*Primary Examiner*—Paul N. Dickson
*Assistant Examiner*—Deann Draper
(74) *Attorney, Agent, or Firm*—Brinks Hofer Gilson & Lione

(57) ABSTRACT

A steering column support assembly for a motor vehicle, comprises a laterally extending support structure (25), mounting points (32) for affixing opposite ends (28,29,30, 31) of the support structure (25) to side portions of a motor vehicle chassis, a fixing point (45) above the laterally extending support structure (25) for affixing the support structure (25) to a front portion of a motor vehicle chassis, and a steering column support bracket (34), the steering column support bracket being supported by the laterally extending support structure (25). The support structure (25) includes a laterally extending first support member (26), and a laterally extending second support member (27). The first support member (26) and the second support member (27) each extend laterally between the mounting points (28,29, 30,31). The steering column support bracket (34) braces apart the first support member (26) and the second support member (27).

8 Claims, 3 Drawing Sheets

MOTOR VEHICLE STEERING COLUMN SUPPORT ASSEMBLY

TECHNICAL FIELD

The present invention relates to a steering column support assembly for supporting a steering column of a motor vehicle.

BACKGROUND OF THE INVENTION

Motor vehicle dashboard assemblies, including the steering wheel and associated support structure, are normally assembled prior to insertion as a unit into the motor vehicle on an assembly line. The support assembly includes a support member that extends laterally with mounting points at left and right ends of the member for connection to fixing points on the motor vehicle chassis forward of the left and right front doors, at the so-called "A-pillars".

Although the support assembly may be used to support part of the dashboard, and components within the dashboard such as a heater unit, the main structural function of the support assembly is to support the steering wheel column, which extends downwards and away from the steering wheel through intervening structures, for example through a firewall between an engine compartment and a passenger compartment. Usually, such intervening structures do not provide direct support to the steering wheel column.

The largest external forces that can be expected to impinge on a steering wheel and steering wheel column are those resulting from a motor vehicle accident. These forces may tend to make the steering column and steering wheel rotate more towards the vertical, which can reduce driver safety. The steering wheel will normally be provided with a driver airbag, and so the steering column and support assembly must be able to bear the forces of the driver against the airbag during a collision.

As a result of these various requirements, steering column support assemblies have been developed that consist of a single tubular steel support member that extends laterally between the A-pillars. The tubular member has a bracket on a lower side of the member to which the steering column is fixed, and a fixing point above the steering column bracket that is used to affix the support assembly to chassis, for example to an upper portion of a firewall between the passenger compartment and the engine compartment. The tubular steel member may be straight or have a series of small bends and is hollow with a circular cross section. The bracket for the steering column, and any other fixing points along the length of the support structure, for example for a car stereo unit or heater/air conditioning unit, must be welded to the tubular steel member.

Welding such an assembly by hand is a skilled job. The welds must be accurately formed, and not adversely affect the structural integrity of the tubular member. When the manufacturer is designing the initial prototype of such a conventional steering column support structure, the time taken to make by hand a finished steering column support structure is a significant constraint.

Hand welding is of course not economic in large-scale production, and so robot welding is used in such circumstances. However a welding machine specially adapted to produce such a steering column support assembly is expensive to buy and to set up for a particular welding job. It may also not be easy to modify or adapt an existing design, for example to accommodate changes in the design of a dashboard or consumer units housed within the dashboard such as a heater, air conditioner, or in-car entertainment system.

BRIEF SUMMARY OF THE INVENTION

It is an object of the invention to provide a steering column support assembly that addresses these issues.

According to the invention, there is provided a steering column support assembly for supporting a steering column of a motor vehicle, comprising a laterally extending support structure, mounting points for affixing opposite ends of the support structure to side portions of a motor vehicle chassis, a fixing point above the laterally extending support structure for affixing the support structure to a front portion of a motor vehicle chassis, and a steering column support bracket, the steering column support bracket being supported by the laterally extending support structure, wherein: the support structure includes a laterally extending first support member, and a laterally extending second support member; the first support member and the second support member each extend laterally between the mounting points; and the steering column support bracket braces apart the first support member and the second support member.

The use of two laterally extending support members is advantageous in several ways. First, it is not necessary that such a structure be welded together. The first and second support members can, for example, be bolted to the steering column support bracket. Second, the use of two spaced apart support members makes it easier to support other components within or beneath the dashboard. Finally, this structure permits a weight reduction compared with a single laterally extending support structure of similar strength and stiffness.

In a preferred embodiment of the invention, the steering column support bracket is supported by the first support member and the second support member respectively at a first location in the support assembly and at a second location in the support assembly, with the fixing point being at a third location in the support assembly. The first, second and third locations are arranged in a triangle formation when viewed along the lateral extent of the support members. This provides stiffness to help minimise forward rotation of the steering column in the event of a collision.

The laterally extending support structure may also provide support for one or more other mounting brackets for supporting consumer units within a dashboard. The mounting brackets may extend between the first support member and the second support member, or extend just from one of the support members. For example, a heater unit or in-car entertainment system, may be supported by one or more mounting brackets that extend transversely between the first and second mounting members. Accelerator, brake or clutch pedals may be supported by a bracket that extends downwardly from a lower one of the support members.

In order to facilitate connection of the steering column support bracket, and any other support brackets, to the laterally extending support structure, the first support member and the second support member may both be straight metallic or plastic hollow tubular members with a square cross-section, a rectangular cross-section, or a U-shaped cross-section.

Also according to the invention, there is provided a motor vehicle dashboard assembly, comprising a fascia, a steering column, and a steering column support assembly, wherein the steering column support assembly supports the steering column, and the steering column support assembly is according to the invention described above.

The steering column support assembly preferably also supports also at least in part the "fascia", i.e., the front panel or panels of the dashboard.

BRIEF DESCRIPTION OF THE DRAWINGS

The invention will now be described in greater detail, by way of example, with reference to the accompanying drawings, in which.

DETAILED DESCRIPTION OF THE INVENTION

Figure 1:
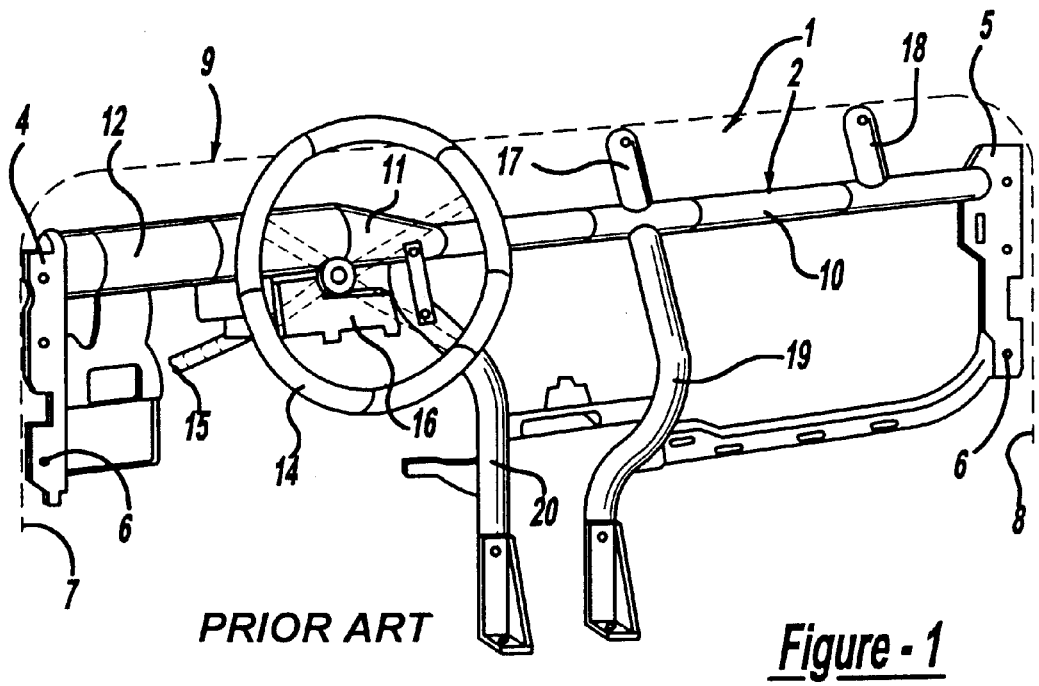
FIG. 1 is a perspective view of a prior art steering column support assembly for a motor vehicle, showing also a steering wheel and steering column.

FIG. 1 shows prior art steering wheel support assembly that consists of a single elongate support structure that extends laterally between two vertically extending brackets 4,5 that have through-holes 6 by which the steering wheel assembly 1 can be affixed to opposite side portions 7,8 of a motor vehicle chassis 9 shown in dashed outline. The support structure 2 is formed from tubular steel subsections of differing diameters welded together into a single elongate unit. A steering wheel 14, steering column 15 and an associated steering wheel support bracket 16 are shown towards a left-hand end of the support structure 2, which is therefore suitable for inclusion in a left-hand drive motor vehicle. If the support structure 2 were for a right-hand drive motor vehicle, then FIG. 1 would be reversed left-right.

Not shown in FIG. 1, for clarity are conventional items associated with a steering wheel, such as control stalks, horn, and airbag.

The steering wheel support bracket 16 is welded to the sub-section 12 of the support structure 2 having the greatest diameter. This provides the maximum strength in the support structure to nearest the steering wheel 14, in order to minimise any movement of the steering wheel 14 and steering column during a motor vehicle collision.

The support structure 2 has a number of brackets 17,18, 19,20 that extend transversely away from the support structure 2. Each of these brackets 17–20 is welded to the support structure 2. The brackets 17,18 do not provide any significant reinforcement to the support structure 2 in the event of a collision, and are intended mainly to support the structure of a dashboard (not shown) extending across the motor vehicle between the left and right side portions 7,8.

Although the prior art steering wheel support structure 2 provides adequate support for the steering wheel 14, steering column 15, and steering wheel column mounting bracket 16, the welds between the various sub-sections 10,11,12 of the support structure 2, and transversely extending brackets 17–20, means that the support structure 2 is relatively difficult and expensive to manufacture, either by hand at the prototype stage, or by robot welding in production.

Figure 2:
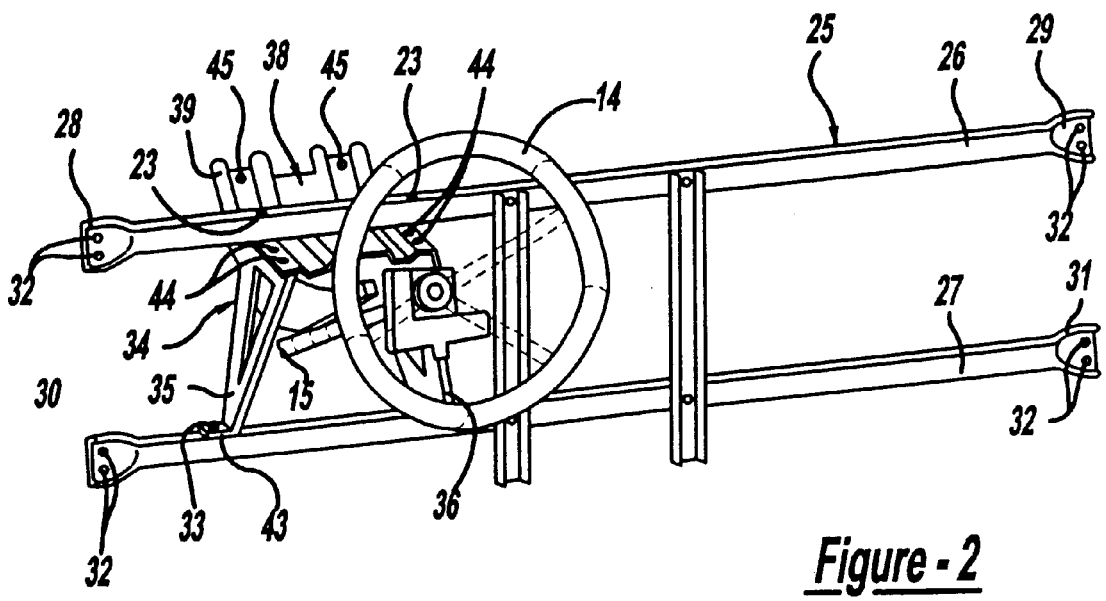
FIG. 2 is a perspective view of a steering column support assembly according to the invention, showing also a steering wheel and steering column.
Figure 3:
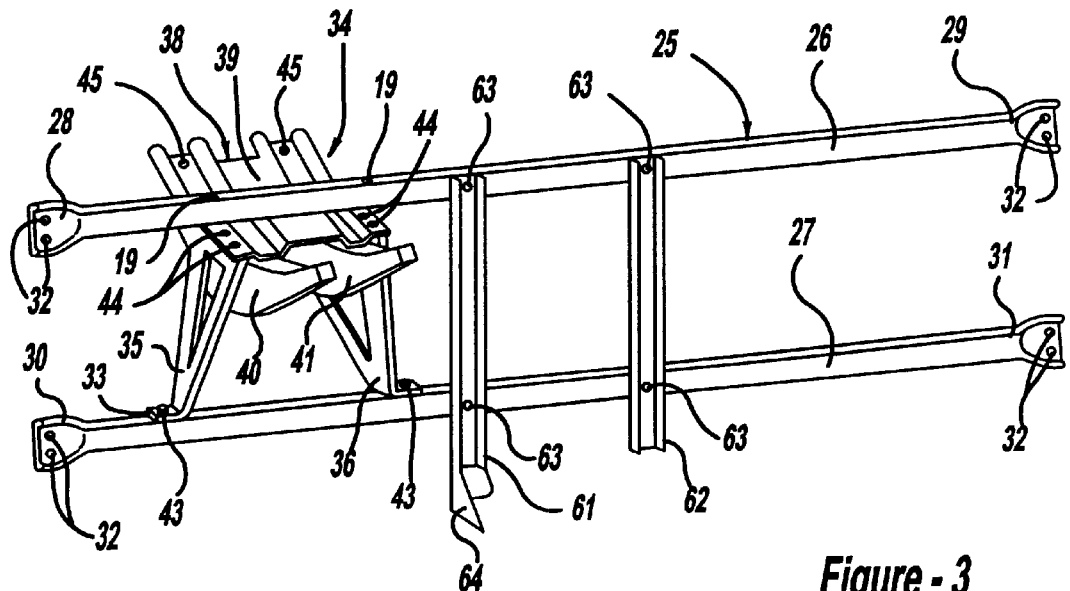
FIG. 3 is a view similar to that of FIG. 2, showing the steering column support assembly without the steering wheel and steering column.
Figure 4:
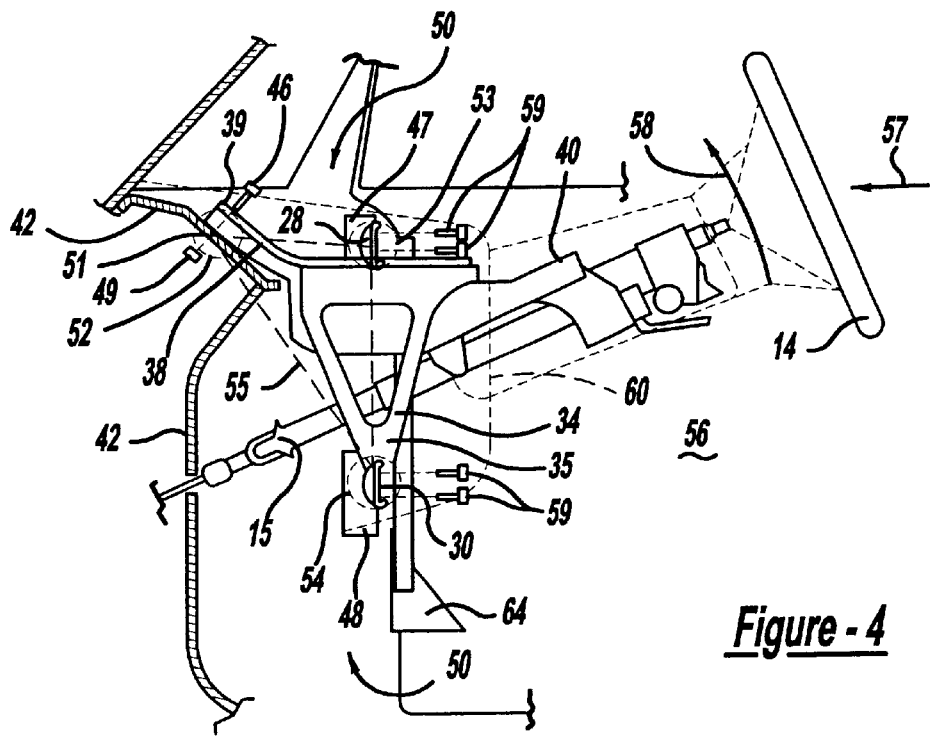
FIG. 4 is a side view of the steering wheel support assembly of FIG. 2.

FIGS. 2, 3 and 4 show various views of a steering wheel support structure 25 according to the invention. The support structure 25 includes a laterally extending first support member 26 and a directly beneath this, a similar laterally extending second support member 27. Each of the upper and lower support members 26,27 is formed from straight square cross-section hollow tubular steel, crimped at each end into a flattened end portion 28,29;30,31 in which through-holes 32 have been drilled.

The upper and lower support members 26,27 are held in a parallel spaced apart relationship by a steering column support bracket 34 that extends between the two support members 26,27. The support bracket 34 includes a pair of similar braces 35,36 each of which is in the shape of an inverted triangle, and each of which is secured at a lower foot 33 by a bolt 43 that passes through the foot to the lower support member 27. The triangular braces 35,36 extend in approximately vertical planes that are transverse to the extent of the upper and lower support members 26,27 and which are spaced apart either side of the steering column 15. Between the triangular braces 35,36 is a support bracket in the form of a corrugated plate 38 that is secured by bolts 44 to an upper side of the inverted triangular braces 35,36.

The corrugated plate 38 lies generally in a plane that is transverse to the triangular braces and parallel to the direction of the upper and lower support members 26,27.

Above the corrugated plate 38 is the upper support member 26. Each one of the triangular braces 35,36 is connected to the upper support member 26 by a bolt 23 that passes through clearance holes (not shown) in the upper support member and corrugated plate 38, so that the plate 38 is sandwiched between the upper support member 26 and triangular braces 35,36.

Below the plate 38 and laterally inside the triangular braces 35,36 is a pair of steering column mounts 40,41 to which the steering column 15 is secured. As can be seen best from FIG. 4, the steering column mounts 40,41 project transversely from between the support members 26,27 towards the steering wheel 14. The top plate 38 has a forwards extending bracket 39 that extends generally in the opposite direction towards a firewall 42 at a front end of a motor vehicle passenger compartment 56.

As can be seen from FIG. 4, the forwards extending bracket 39 provides a fixing point, indicated by a dashed circle 52, for the steering column support 25 that is directly above and forwards of the triangular braces 35,36. The forwards extending projection 39 is secured to the firewall 42 by two spaced apart bolts 46 that pass through the two matching through-holes 45,51 in the projection 39 and firewall 42 to a pair of nuts 49.

The top and bottom support members 26,27 are likewise secured at each end to separate upper and lower mounting plates 47,48 on the motor vehicle chassis in the area of both the left and right "A-pillars" 50 by bolts 59 passing through the through-holes 32 in the flat end portions 28–31 at the ends of the support members 26,27. The mounting brackets 47,48 on the A-pillars 50 hold the ends of the two support members 26,27 parallel with each other and provide some support in a horizontal direction 57 transverse to the support members 26,27 along which forces impinge on the steering wheel in the event of a collision. A main part of the reinforcement against forces in the direction 57 however is provided by the horizontal plate 38 and its connection at the fixing point 52 to the firewall 42.

As can be seen from FIG. 4, the projecting bracket 39 is located transversely forwards from the upper support member 26 and then secured by the bolts 46 to the firewall. This provides reinforcement to the upper support member 26 in the horizontal direction 57. The pair of side braces 35,36 extending between the upper and lower support members 26,27 provide additional reinforcement to any rotational upwards movement of the steering wheel 14 and steering column 15 in the event of a collision.

These features can be appreciated by considering the bracket fixing point 52, and two other fixing points, indicated by dashed circles 53,54, where the upper and lower transverse members 26,27 are affixed to the two side braces 35,36. These three locations 52,53,54 are in the formation of a triangle 55 shown in heavy dashed outline in FIG. 4. As can be appreciated with a comparison of FIG. 3, this triangle formation 55 extends both sides of the steering column 15 due to the symmetric left-right design of the steering column support bracket 34 about the steering column 15. Because the triangle formation 55 is secured at the fixing point 52 and, via the support members 26,27, supported by the A-pillar mounting brackets 47,48, this formation 55 provides good stiffness and reinforces the steering wheel 14 against horizontal movement 57 and upwards rotational movement 58 in the event of a collision.

The upper and lower support members 26,27 can also be used to secure the dashboard, shown in dashed outline 60 in FIG. 4, as well as any consumer units (not shown) such as a heater, air-conditioner or in-car entertainment system (not shown). FIG. 3 shows one way in which this can be done, by means of two vertically extending and spaced apart parallel brackets 61,62 connected at bolts 63 to both the upper and lower support members 26,27. These transverse brackets 61,62 may provide some additional transverse bracing, although this is not significant compared with the bracing provided by the two side braces 35,36 on either side of the steering column 15.

The transverse brackets 61 nearest the steering column 15 has a shoe 64 at a lower end that can be used to support a pedal assembly (not shown) for an accelerator pedal, brake pedal, or clutch pedal.

The structure described above is formed mainly in steel. The transverse members 26,27 each have a square hollow cross-section 40 mm on one side with a 2 mm wall thickness. If aluminium is used for the transverse members 26,27, then this can also be 40 mm square, with a wall thickness of 3 mm. The support members, 26,27 are spaced apart in a vertical plane by 300 mm. This design achieves a sufficient torsional stiffness so that the lowest vertical vibrational frequency of the supported steering column is greater than 85% of the column natural frequency. This is sufficiently high to avoid vibration when the engine is idling at about 900 rpm.

Compared with the prior art designs shown in FIG. 1, the steering column support assembly 25 according to the invention results in a significant weight reduction, for example, a weight reduction of between about 10% to 20%. A further reduction can be achieved if the assembly 25 is formed mainly or entirely in aluminium or magnesium alloys.

Figure 5:
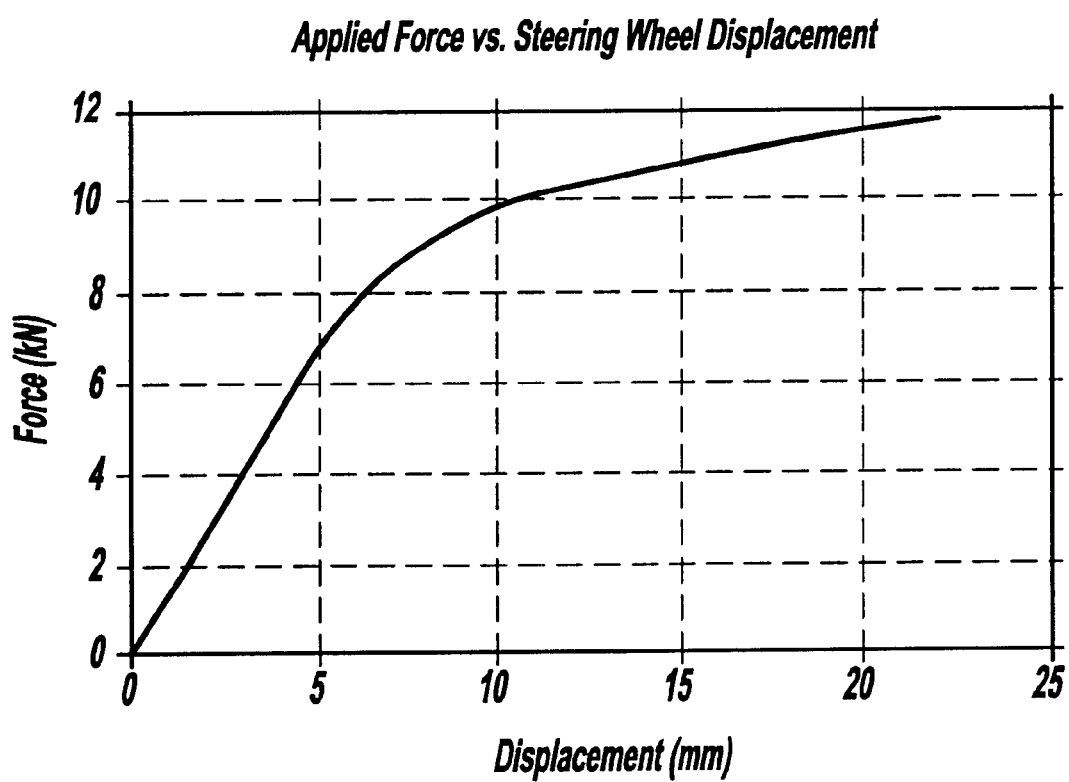
FIG. 5 is a plot of applied force versus displacement for the steering wheel support assembly of FIG. 2.

FIG. 5 shows the performance of the steering column support assembly 25, as calculated by finite element analysis in terms of the displacement of the steering wheel 14 for an applied force. The graph shows that an applied force of 10 kN, the displacement is about 11 mm, and at an applied force of 11.5 kN, the displacement is about 23 mm. This is an improvement over the performance of the prior art design shown in FIG. 1.

Because the steering column support assembly 25 is not welded, but screwed or bolted together, it is relatively easy to modify the structure to accommodate changes in the design of the dashboard. The support assembly 25 is less expensive to produce in a working prototype than a welded design based on a single laterally extending support member, and quicker and easier to put into production. The use of two parallel laterally spaced support members with a steering column support bracket provides an inherently strong design, with sufficient stiffness to avoid low frequency vibration and good stability in the event of a collision. The invention therefore provides an economical and convenient steering support assembly for use in a motor vehicle.

It is to be recognized that various alterations, modifications, and/or additions may be introduced into the constructions and arrangements of parts described above without departing from the spirit or ambit of the present invention.

What is claimed is:

1. A steering column support assembly for supporting a steering column of a motor vehicle, comprising a laterally extending support structure, mounting points for affixing opposite ends of the support structure to side portions of a motor vehicle chassis, a fixing point above the laterally extending support structure for affixing the support structure to a front portion of a motor vehicle chassis, and a steering column support bracket, the steering column support bracket being supported by the laterally extending support structure, wherein:

the support structure includes a laterally extending first support member, and a laterally extending second support member;

the first support member and the second support member each extend laterally between the mounting points; and the steering column support bracket braces apart the first support member and the second support member.

2. A steering column support assembly as claimed in claim 1, in which there are just two support members.

3. A steering column support assembly as claimed in claim 1, in which the fixing point is a bracket that extends transversely away from the laterally extending support structure.

4. A steering column as claimed in claim 1, in which the fixing point is directly above and forwards of the steering column support bracket.

5. A steering column support assembly as claimed in claim 1, in which the steering column support bracket is supported by the first support member and the second support member respectively at a first location in the support assembly and at a second location in the support assembly, and the fixing point is at a third location in the support assembly, the first, second and third locations being arranged in a triangle formation when viewed along the lateral extent of the support members.

6. A steering column support assembly as claimed claim 1, in which the first support member and the second support member are both a straight hollow tubular member with a square or a rectangular cross-section.

7. A steering column support assembly as claimed in claim 1, in which one or more mounting brackets extends between the first support member and the second support member for supporting consumer units within a dashboard.

8. A motor vehicle dashboard assembly, comprising a fascia, a steering column, and a steering column support assembly, wherein the steering column support assembly supports the steering column, and the steering column support assembly comprises a laterally extending support structure, mounting points for affixing opposite ends of the support structure to side portions of a motor vehicle chassis, a fixing point above the laterally extending support structure for affixing the support structure to a front portion of a motor vehicle chassis, and a steering column support bracket, the steering column support bracket being supported by the laterally extending support structure, wherein:

the support structure includes a laterally extending first support member, and a laterally extending second support member;

the first support member and the second support member each extend laterally between the mounting points; and the steering column support bracket braces apart the first support member and the second support member.

* * * * *